(No Model.) 5 Sheets—Sheet 1.
J. H. SPURGIN.
BAND CUTTER AND FEEDER FOR THRASHING MACHINES.
No. 502,592. Patented Aug. 1, 1893.
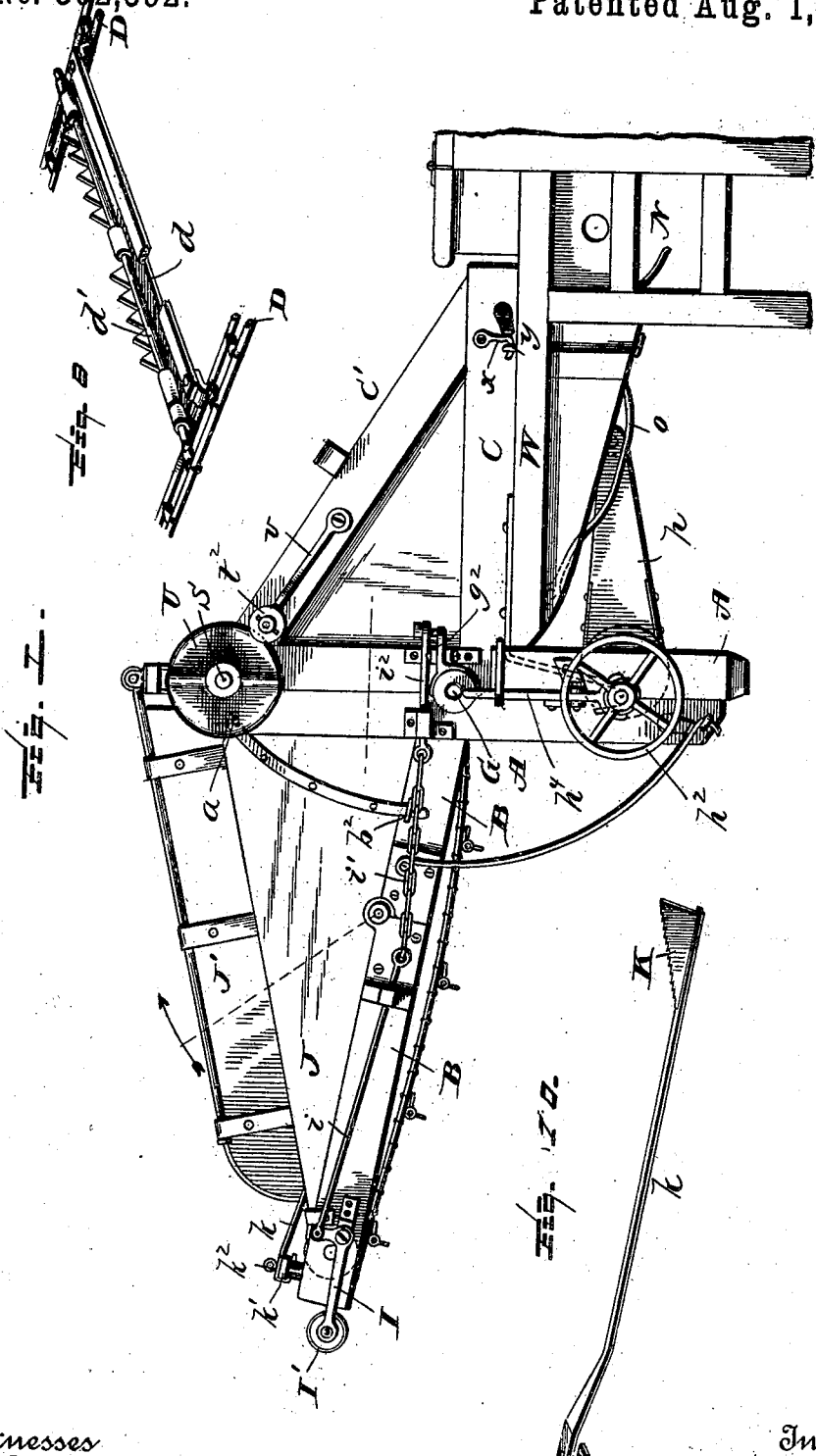

(No Model.) 5 Sheets—Sheet 2.
J. H. SPURGIN.
BAND CUTTER AND FEEDER FOR THRASHING MACHINES.
No. 502,592. Patented Aug. 1, 1893.
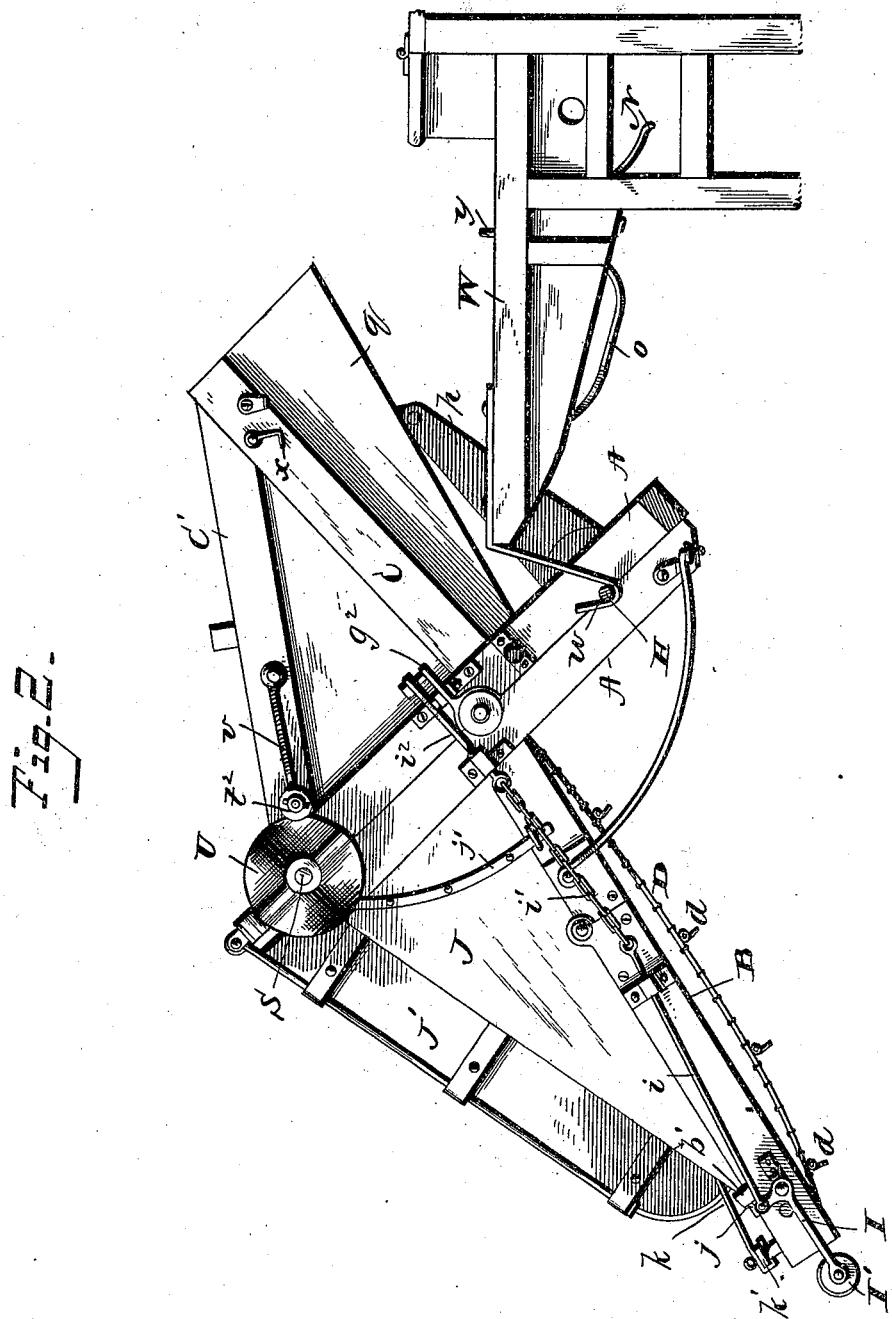
Witnesses
C. J. Williamson
John Boyd
Inventor
John H. Spurgin.
per Chas. N. Fowler
Attorney

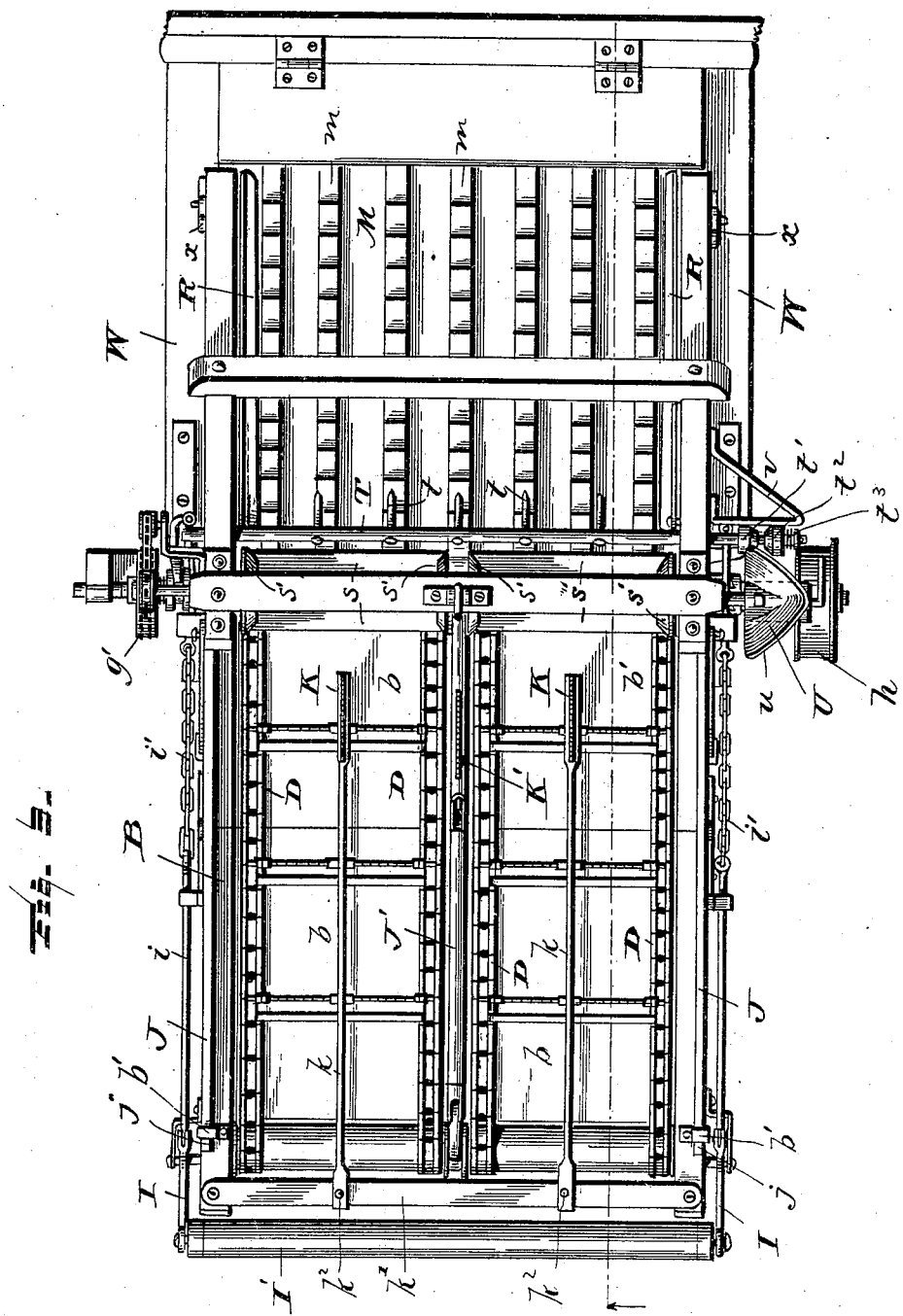

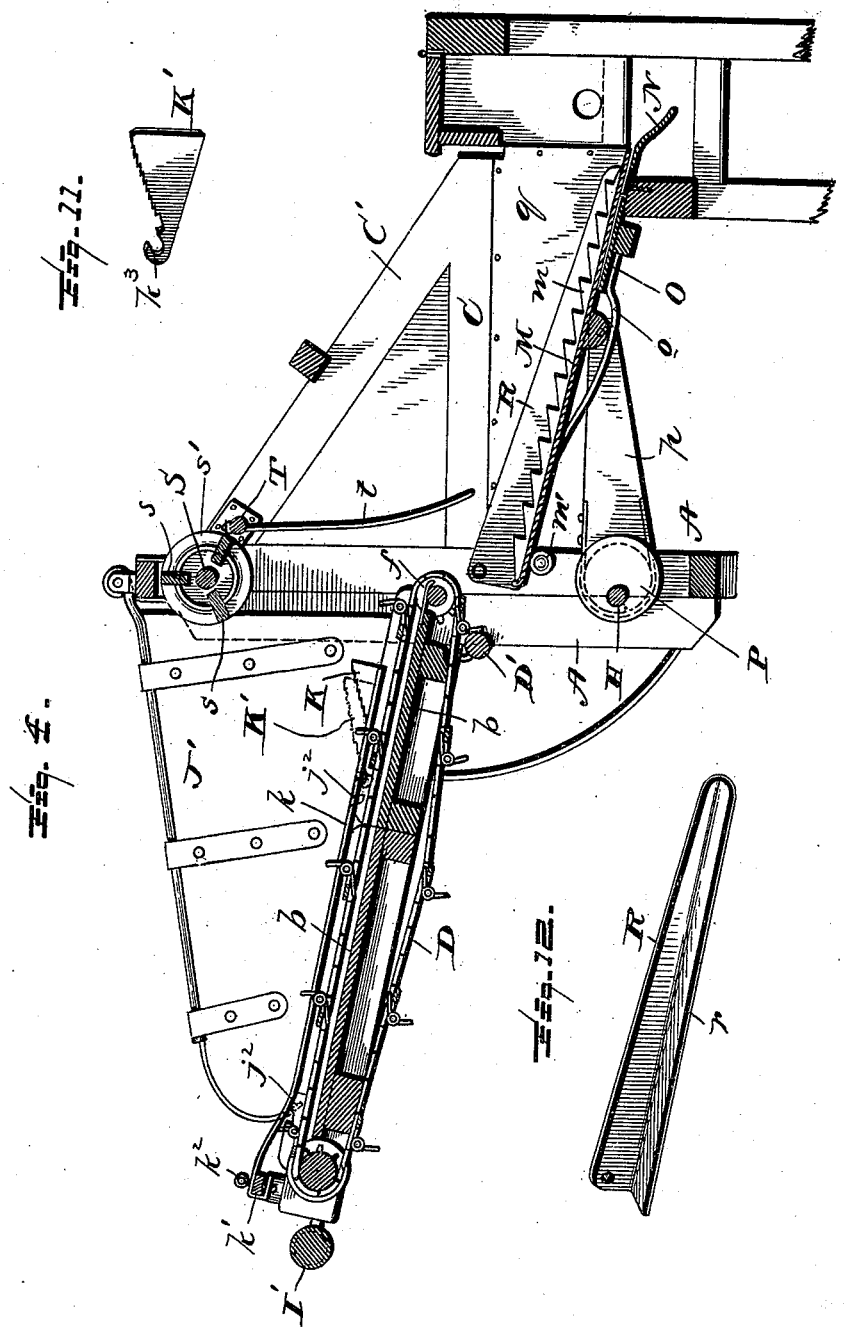

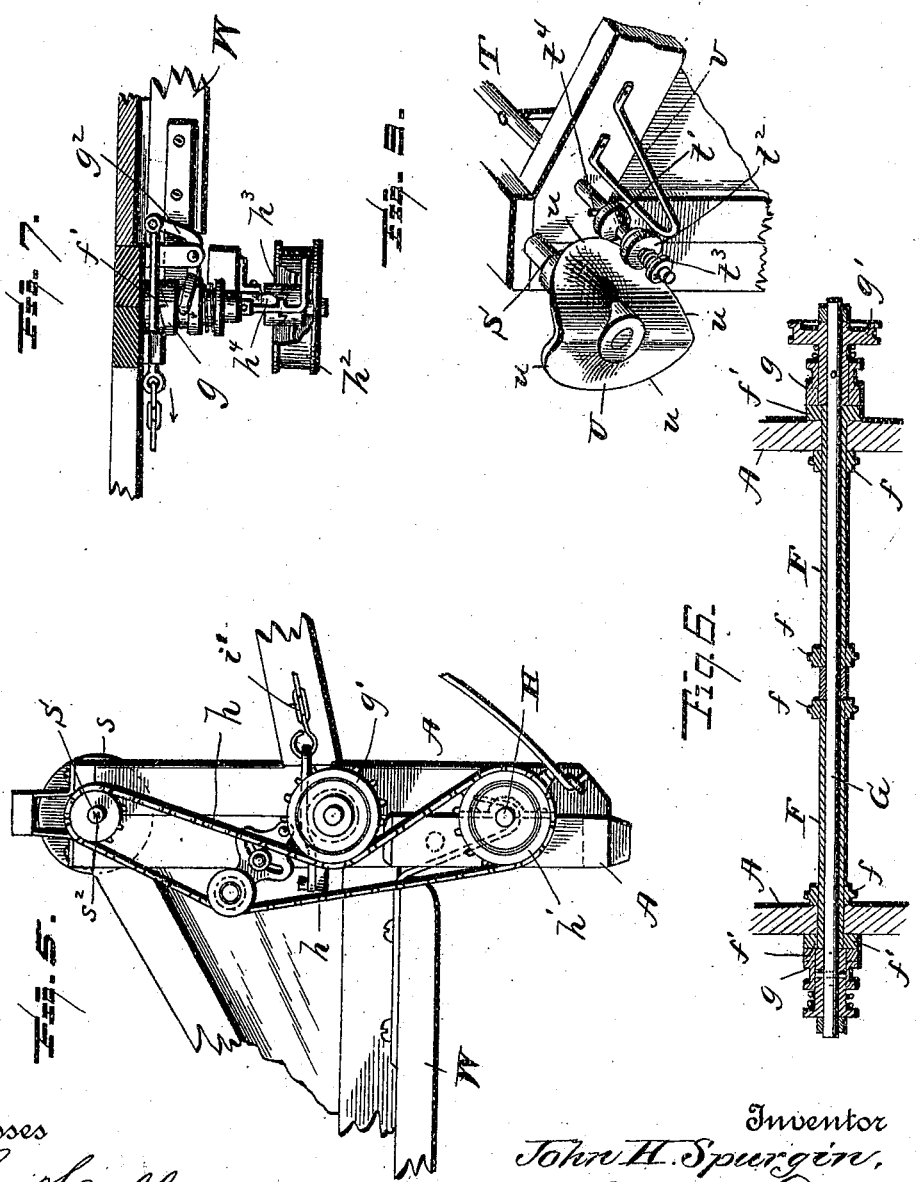

UNITED STATES PATENT OFFICE.

JOHN H. SPURGIN, OF CARTHAGE, MISSOURI.

BAND-CUTTER AND FEEDER FOR THRASHING-MACHINES.

SPECIFICATION forming part of Letters Patent No. 502,592, dated August 1, 1893.

Application filed February 28, 1893. Serial No. 464,098. (No model.)

*To all whom it may concern:*

Be it known that I, JOHN H. SPURGIN, a citizen of the United States, residing at Carthage, in the county of Jasper and State of Missouri, have invented certain new and useful Improvements in Band-Cutters and Feeders for Thrashing-Machines; and I do hereby declare that the following is a full, clear, and exact description of the same, reference being had to the annexed drawings, making a part of this specification, and to the letters of reference marked thereon.

The present invention has relation to band cutters and feeders for thrashing machines, and my object is to provide a mechanism of this class that shall be capable of ready attachment to the thrashing machines as ordinarily built, without any inconvenient modification of either to adapt it to the other; shall be capable of easy adjustment out of the way to afford access to the adjacent parts of the thrasher, shall be thoroughly efficient in its work, and simplified in its structure.

To these ends said invention consists in the construction and combination of parts, substantially as and for the purposes hereinafter specified.

Figure 1 of the drawings is a side view of my invention connected with a thrashing machine; Fig. 2 a like view thereof when arranged to permit access to the thrashing cylinder; Fig. 3 a plan view, as shown in Fig. 1; Fig. 4 a longitudinal section; Fig. 5 a detail side view of the gearing for driving the conveyers and beaters; Fig. 6 a longitudinal section through the shaft for driving the conveyers; Fig. 7 a detail view of the clutch devices to stop both or one of the conveyers; Fig. 8 a detail view of a conveyer bundle engaging slat; Fig. 9 a detail view of the spreader vibrating mechanism. Figs. 10 and 11 are views of the two forms of knives, and Fig. 12 a detail view of the pivoted plates to co-operate with the grain or feeder board.

My object, more especially has been to improve upon the machines for which I have received Letters Patent Nos. 365,548 and 388,595, and in some general respects my present invention will be found similar to said machines, and more particularly the one covered by the latter patent.

The frame of my present machine comprises on each side two adjoining, upright or vertical beams or posts A, A, and outwardly and upwardly inclined beam B attached to said beams A at or near their vertical centers, a horizontally extending bar C on the side of the beams A opposite the beam B, and attached to the beams A at a point slightly below the point of attachment of the beam B, and an inclined beam C' connecting the upper ends of the beams A and the outer end of the beam C. The uprights or beams A of one side are connected to those of the other by cross bars at both their top and bottom ends, and if desired other cross bars may connect the beams B, B, to each other and as well the beams C', C', to each other.

Between the beams B, B, I locate the bundle carrier and band cutting mechanism, and between the beams C, C', and C C' the device for feeding the loose grain into the thrashing machine. The former mechanism, as in my Patent No. 388,595, comprises two independent, parallel-arranged endless conveyers, that move over and under a platform or table $b$ that extends between the beams B, B. Each conveyer consists of two separated sprocket chains D, that at certain intervals are connected by bundle engaging devices of peculiar construction to be presently described.

Motion is imparted to the conveyer by a sprocket wheel $f$ for each chain that is fastened to and rotates with a sleeve F mounted loosely upon a transverse shaft G located at the lower end of the table $b$ and receiving its support through the sleeve, from the uprights A, A on each side of the machine. The outer end of each sleeve $f$ passes through and is journaled by said uprights. Upon its outer end each sleeve F is formed into or carries a clutch face $f'$ that is adapted to be engaged by a sliding clutch $g$ keyed to the shaft G. By means of this clutch the sleeve can be connected with the shaft G, so as to be rotated thereby and disengaged therefrom and remain stationary while said shaft rotates. It will be seen that each sleeve $f$, has its own clutch mechanism, that of one being on one side of the machine and that of the other on the opposite side of the machine.

As the sleeves are connected with and derive motion from the shaft G by the sliding clutches $g, g$ which are keyed to the shaft, no separate driving gear is necessary for each sleeve, but it is needful only to drive the shaft G. For this purpose the latter has on one of its ends beyond the side of the machine a sprocket wheel $g'$ that is connected by a sprocket chain $h$ with a like wheel $h'$ on a main shaft H located below the shaft G and journaled in the uprights A A. The shaft H extends entirely across the machine and upon its end opposite that carrying the wheel $h'$ has a band wheel $h^2$ that is adapted to be connected, with or disconnected from said shaft by an ordinary clutch mechanism $h^3$ operated by a hand shipping lever $h^4$. The band wheel $h^2$ is placed so as to be in line with the band wheel of the engine and that of the thrashing cylinder, so that the belt connecting these two can be utilized to drive said wheel $h^2$, this being done simply by passing such belt over the wheel $h^2$ and allow it to rest thereon and of its weight furnish sufficient friction to drive said wheel. I thus avoid an extra belt and wheel to operate my mechanism. The wheel $h^2$ is flanged as shown to prevent the belt slipping off of it.

Each sliding clutch $g$ is forced normally into engagement with the clutch face of its sleeve $f$ by a coiled spring in a well known way, and to move it out of engagement there is provided a pivoted clutch lever $g^2$ that is adapted to be operated from the outer end of the table $b$. The means enabling this to be done consist of a bell-crank lever I pivoted to the side of the beam B near its outer end and connected by one of its arms to said lever $g'$ by means of a bar $i$, a section of chain $i'$ and a second bar $i^2$. The other arms of the levers I (it being understood that the clutch operating means are duplicated on both sides of the machine) I connect by a cross bar I' by means of which both clutch devices can be very conveniently operated simultaneously to stop the operation of the conveyers. The connection of the cross bar I', however with said levers is made so loose as to enable either lever I to be operated without disturbing the other, and thus permitting one conveyer at a time to be stopped.

The bundles are confined in place upon each conveyer and guided down the platform, by two outside walls J, J, mounted upon the beams B, B, and a middle wall or partition J', placed between the two conveyers. The side pieces J are secured detachably in place by a metal toe or point $j$ at the outer end of each which engages a strap or loop $b'$ upon the outer end of the beam B, and a curved bar $j'$ attached to its side one end of which projects beyond the rear edge of said piece and hooks over a bolt $a$ on one end of the beams A, and the outer end of which projects below the bottom edge thereof and enters an eye or strap $b^2$ on the side of the beam B. The middle partition J' is not mounted, so as to be removable entirely but is pivoted at its rear upper corner to the cross bar that unites the tops of the uprights A, A. Said partition when down in place is held there by inclined pins $j^2 j^2$ that enter sockets or openings in the platform $b$. One purpose of hinging or pivoting the partition J' and the purpose in making J and J removable is to enable the machine when not in use to be made compact by folding up the greater portion of the platform $b$ which is made possible by hinging it and the beams B at $b^3$.

The band cutters consist each of a triangular knife K having the edge corresponding to the hypotenuse of the triangle serrated and inclining downward and forward toward the approaching bundle. Each knife is held near the lower end of the platform $b$ on the extremity of a bar $k$ running just above and parallel with the conveyer beneath it, and hooked at its outer end over a cross bar $k'$, to which it is detachably fastened by a pin $k^2$. The weight of the bundles is sufficient to insure the bands being cut by the knives.

To enable bundles too large to pass between the middle wall J' and an outer wall J to be cut, a third knife K' is provided that is just like the others, but located midway between the conveyers in position to be housed or covered by the partition J' when the same is down in place. Said knife is exposed when this partition is thrown back on its pivot in order to increase the space to accommodate the large bundles. This knife K' is seated in a slot in the platform $b$ and held therein by having its front end hooked at $k^3$ to engage a cross pin in said slot.

The bundle engaging devices carried by the sprocket chains D, D consist of L- or angle-shaped slats $d$ having one web or flange toothed or serrated, and pivotally mounted on rods $d'$ that extend between the two chains D, D. When moving along the upper side of the platform $b$ the notched web will be firmly held in a vertical position to positively engage a bundle by the other web resting upon the upper surface of said platform. As soon as the lower, discharge end of the platform is reached and the slats $d$ begin to go beneath the platform, the notched member is allowed to swing to a horizontal position since the other member is then free, and is preferably positively so swung by engaging a cross bar or rod D'. The cross bar D' also serves to prevent the conveyers falling upon and interfering with the grain board or feeder M. This construction of slat insures the freeing of the grain therefrom at the delivery end of the platform and thus prevents any being carried along under the latter. The notched web is instantly swung into vertical bundle engaging position as soon as the front end of the upper side of the platform $b$ is reached.

From the conveyers the loose straw is discharged upon the downwardly inclined reciprocable grain board or feeder M, consisting of a plate of sheet metal to whose upper side are attached a number of parallel bars $m$, whose upper faces are provided with ratchet tooth-like projections, having their abrupt sides toward the lower end of the board M. At its lower end the grain board discharges to the concave N, and there rests upon a transverse plate O that is attached to two rods $o, o$ that are pivoted at their free ends to the sides of the throat of the thrasher so as to enable said plate and thus the lower end of the grain board to be raised and lowered. This adjustment of the grain board or feeder is made to accommodate it to the various adjustments of the concave that are usually provided for in view of the varying character of the grain to be thrashed. The high end of the grain board rests upon two rollers $m', m'$, attached each to the inner side of one of the posts or uprights A, A, and motion is given to the said board by two eccentrics P, P mounted on the shaft H and connected to the under side of the board by the pitmen $p, p$.

The weight of the grain board or feeder is entirely sufficient to keep it in its proper position.

The sides of the feeder chamber consist each of a thin metal plate $q$ triangular in shape and attached to and depending from each bar C. By using these thin metal walls or sides there is no material reduction of the width of the throat of the thrasher into which they extend.

To prevent loose or shattered grain passing between the edges of the grain board or feeder and the side walls $q, q$ and thus being lost, I pivot to each side wall a plate R, having a horizontal flange $r$ that rests upon the upper side of said grain board adjoining its edge, and thus covers any space that might exist between the same and said side wall. The plate R is pivoted near the front or receiving end of the grain board so as to always adapt itself to the position of the latter whatever it may be by the raising or lowering of its rear or discharging end.

For facilitating the discharge of grain from the conveyers to the grain board, should the same become entangled, or from other causes tend to clog, I employ a beater for each conveyer mounted on a transverse shaft S located vertically above the discharge end of the conveyer platform $b$. Each beater consists of three equi-distant parallel straight strips or wings $s$, attached at their opposite ends to collars or disks $s', s'$ attached to the shaft S, said collars having on their inner faces annular flanges that are engaged by notches in the ends of the wings. The beaters are driven by the sprocket chain $h$ that passes around a wheel $s^2$ on one of the projecting ends of the shaft S. The loose grain after its delivery to the grain board is spread or distributed thereon by means of a number of curved, downwardly extending fingers $t, t$ that depend from a shaft T extending parallel with the beater shaft S, and being journaled near the upper ends of the beams C', C'. These fingers $t$ are moved laterally to perform their spreading function by means of a cam U on the beater shaft S that consists of four spiral flanges $u$ that alternately extend in opposite directions, but are connected so as to form a continuous, working surface. Said cam engages two collars $t', t^2$ on the shaft T having conical faces that adjoin each other, and thus imparts to the shaft, and its fingers a rapid reciprocatory motion. The collar $t^2$ is held yieldingly into contact with the cam by a coiled spring $t^3$ on the shaft which spring operates as a cushion to deaden or reduce the noise incident to the operation of the parts, and also to prevent injury thereto by sudden and violent blows, or obstructions to the lateral movement of the fingers. The thrust of the cam U against the shaft T in a direction at right angles to its axis is largely sustained by a bar $v$ attached to the adjacent beam C' and extending parallel with said shaft in position to engage the collars $t'$ and $t^2$ at points directly opposite said cam.

The shaft T is a rock shaft to enable the fingers to automatically adapt themselves by rising and falling according to the quantity of grain engaged by them. Said fingers are kept from falling too far by a stop $t^4$ on the shaft T that engages at the proper time the bar $v$.

I attach my machine to the thrasher in the following way: To the outer ends of each of the side sills W W that are formed on all thrashing machines, (at least all in use with which I am familiar) and between which is the throat leading to the thrasher cylinder, I attach a bracket or hanger consisting of a metal strap with its lower end formed into a hook $w$. Into these hooks I place the portion of the main shaft H that projects from the posts A, A, on each side of the machine, and rest the beams C, C on the sills W, W, locking said beams to the latter by hooks $x, x$ on the beams that engage eyes $y, y$ on the sills.

My manner of connecting my machine with the thrasher is of great value, since access can be had to the concave and cylinder when necessary without complete separation simply by disengaging the hooks $x$ and eyes $y$ and allowing the machine to tilt downward on the bearings formed by the hooks $w$ until its front end strikes the ground, such tilting having the effect of lifting the grain board or feeder end out of the throat of the thrasher. This tilting is made easy as the main shaft is located near the center of gravity of the machine, and for this reason the restoration to operative position is also easy.

When my machine is to be removed entirely from the thrasher it is necessary simply to lift the main shaft out of the hooks $w$ after the hooks $x$ and eyes $y$ have been disengaged. Besides the advantages just indicated my connecting devices are extremely simple, and enable the use of my machine with various make of thrasher of like size.

It will be understood, that when the use of the machine is to be discontinued, and in connection with the thrasher it is to be moved that to fold the conveyer and platform portion, as hereinbefore indicated, it is necessary simply to remove the two side pieces J, and throw the middle piece J' backward on its pivot, and to detach the three knives, whereupon the front portion of the platform $b$ can be turned upward and backward until it strikes the tops of the side posts A, A. Said front part, also when desired can be completely detached by separating it at the hinges $b^3$, and disconnecting the links of sprocket chains D.

In describing the construction of the machine, I have shown in the drawings, what I consider the best means of operating the parts or imparting motion thereto, but other well known means or any suitable arrangement of gearing may be substituted for that shown, and I wish it understood that I reserve the right to make any changes or modifications in the several details of construction that would be considered as coming within ordinary mechanical skill, and this without departing from the principle of my invention.

I claim—

1. In combination with a thrashing machine having sills at its receiving end, a band cutter and feeder having beams resting on said sills and having one of its shafts pivoted to said sills whereby the inner end of the cutter and feeder can be raised from said receiving end of the thrasher, substantially as specified.

2. In combination with a thrashing machine a band cutter and feeder, having its main shaft located intermediate of its ends, and journaled in bearings on said machine to form a pivotal connection between the latter and the feeder and cutter, as set forth.

3. In combination with a thrashing machine having hangers depending from sills at its receiving end, a band cutter and feeder pivoted to said hangers, and having beams resting upon said sills as shown.

4. In a band cutter and feeder in combination with a grain board or feeder, an adjustable support therefor comprising a transverse plate or bar at its delivery end and pivoted bars to which said plate is attached, as shown.

5. A band cutter and feeder having a movable grain board, and provided with a movable plate having a horizontal extension overlapping the edge of the board, as shown.

6. A band cutter and feeder having an adjustable movable grain board or feeder, and provided with a plate pivoted at one end and having a horizontal portion overlapping the edge of the board.

7. A band cutter and feeder having its bundle conveying and cutting platform formed of hinged sections, and having a knife supported on the inner end of a detachable bar that extends inward over the platform.

8. In combination with two bundle conveying and cutting mechanisms, a cutting device placed between said mechanisms, as shown.

9. In combination with two bundle conveying and cutting mechanisms, and the removable partition between them, a cutting device adapted to be rendered operative by the removal of said partition as shown.

10. In combination with two bundle conveying and cutting mechanisms, the removable partition between them and a knife adapted to be housed thereby when said partition is in its place, as shown.

11. In combination with two independent conveyers having each a clutch mechanism, a rod or bar connected loosely with both clutch mechanisms to operate either or both simultaneously, as shown.

12. In combination with the spreader shaft the collars on said shaft and the cam engaging said collars, one of the latter being held yieldingly against said cam, as shown.

13. In combination, the main shaft, the two independent conveyers, the driving shaft therefor having a clutch mechanism for each, the sprocket wheel on said driving shaft, the sprocket wheel on the main shaft, the reciprocable feeder the pitman and eccentric connection between it and the main shaft, the beater shaft having a sprocket wheel, and the chain connecting all of said sprocket wheels, as shown.

14. In combination with the cylinder and concave of a thrashing machine having a throat leading thereto, on whose side are sills a band cutter and feeder having its feeder mechanism extended in said throat and provided with thin side walls, and beams on the cutter and feeder resting on said sills, as shown.

In testimony that I claim the above I have hereunto subscribed my name in the presence of two witnesses.

JOHN H. SPURGIN.

Witnesses:
W. T. GREEN,
J. S. MEALY.